United States Patent
McKenzie

Patent Number: 5,544,722
Date of Patent: Aug. 13, 1996

[54] GUIDE ASSEMBLY

[75] Inventor: Ian A. McKenzie, Transvaal, South Africa

[73] Assignee: Continental Aktiengesellschaft, Hanover, Germany

[21] Appl. No.: 306,948

[22] Filed: Sep. 16, 1994

[51] Int. Cl.$^6$ ............................................. B66B 7/04
[52] U.S. Cl. ............................................. 187/410; 187/406
[58] Field of Search .......................... 187/410, 409, 187/406

[56] References Cited

U.S. PATENT DOCUMENTS

| | | | |
|---|---|---|---|
| 1,854,976 | 4/1932 | Brady | 187/410 X |
| 3,099,334 | 7/1963 | Tucker | 187/406 |
| 4,434,876 | 3/1984 | McKechnie | 187/410 |
| 4,754,849 | 7/1988 | Ando | 187/409 |

FOREIGN PATENT DOCUMENTS

| | | | |
|---|---|---|---|
| 5116869 | 5/1993 | Japan | 187/410 X |
| 5124783 | 5/1993 | Japan | 187/410 X |
| 2262932 | 7/1993 | United Kingdom | 187/410 X |

Primary Examiner—William E. Terrell
Assistant Examiner—Dean A. Reichard
Attorney, Agent, or Firm—Walter Ottesen

[57] ABSTRACT

A guide assembly has a roller to guide a conveyance within a shaft. The assembly includes first and second biasing devices and a support for the roller.

19 Claims, 4 Drawing Sheets

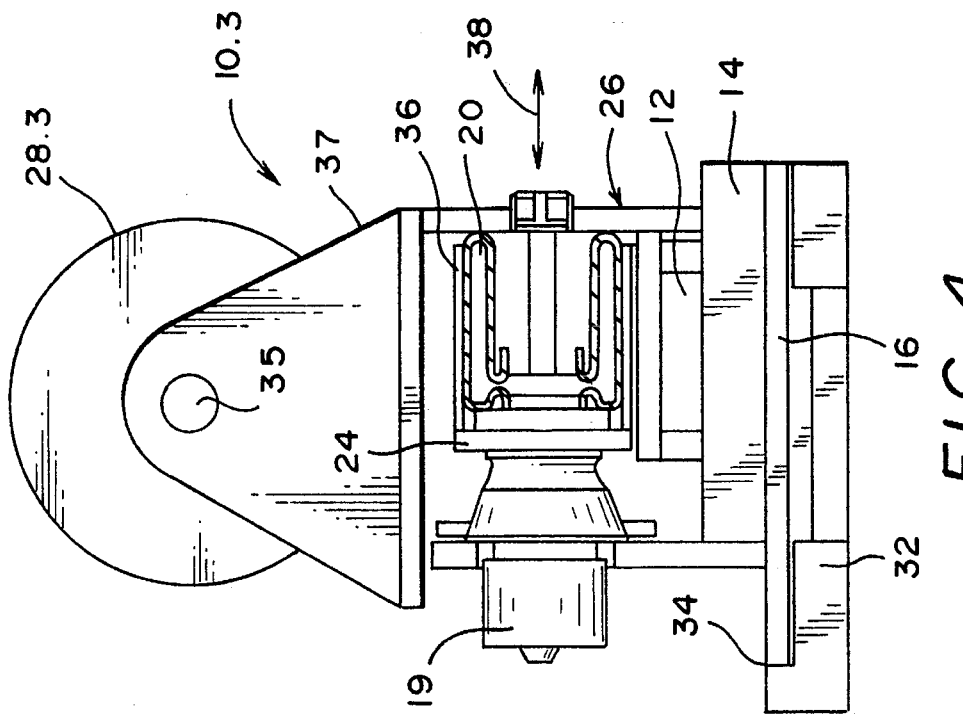
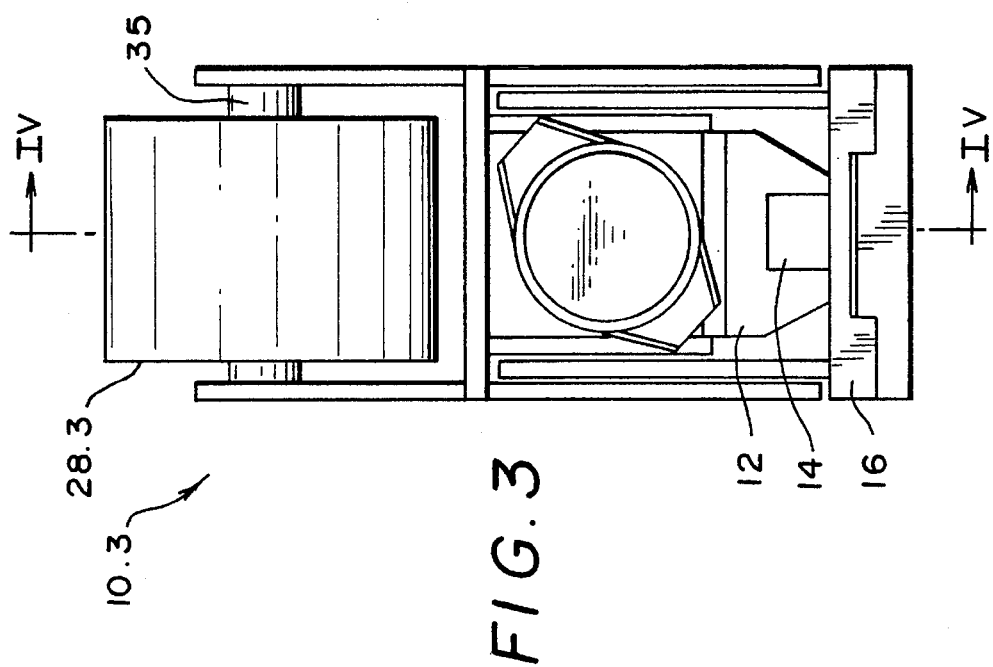

GUIDE ASSEMBLY

BACKGROUND OF THE INVENTION

This invention relates to a guide assembly. More particularly, but not exclusively, this invention relates to a guide assembly for a roller used to guide a conveyance within a shaft.

The shaft can be a shaft in a mine having a depth extending as far as two kilometers into the earth. The guide assembly is mounted on the conveyance which can be, for example, a cage for transporting personnel into and out of the mine and/or a skip for conveying ore and the like. Shafts can be provided with two, three or more rails for guiding the conveyance. Guide assemblies are mounted on the conveyance for guiding the conveyance along the rail while the conveyance is moved along the shaft via appropriate cables connected to the conveyance.

SUMMARY OF THE INVENTION

According to the invention, a guide assembly includes: first and second biasing means; and, support means for a follower to which a lateral load is applied. The first biasing means can have a greater stiffness than the second biasing means.

The first and second biasing means may be located in series with one another. However, and according to another embodiment, the first and second biasing means may be located in parallel with one another.

The guide assembly can include: a damper; a slider; and, support means mounted on a slideway via the slider.

The first biasing means may exert an increasing force during its compression while the second biasing-means may exert substantially constant force during its extension and compression.

The follower may be a roller, wheel or the like.

According to another aspect of the invention, a method of biasing a follower from a median position may include the steps of exerting a substantially constant force on the follower when it moves in one direction from its median position and exerting an increasing force on the follower when it moves in the opposite direction from its median position.

The increasing force can increase from the level of the substantially constant force. The increasing force can increase substantially exponentially.

BRIEF DESCRIPTION OF THE DRAWINGS

The invention will now be described with reference to the drawings wherein:

FIG. 3 is an end view of a guide assembly according to another embodiment of the invention with a center roller mounted thereon;

FIG. 4 is a cross-sectional side view along line IV—IV of FIG. 3;

DESCRIPTION OF THE PREFERRED EMBODIMENTS OF THE INVENTION

Figure 2:
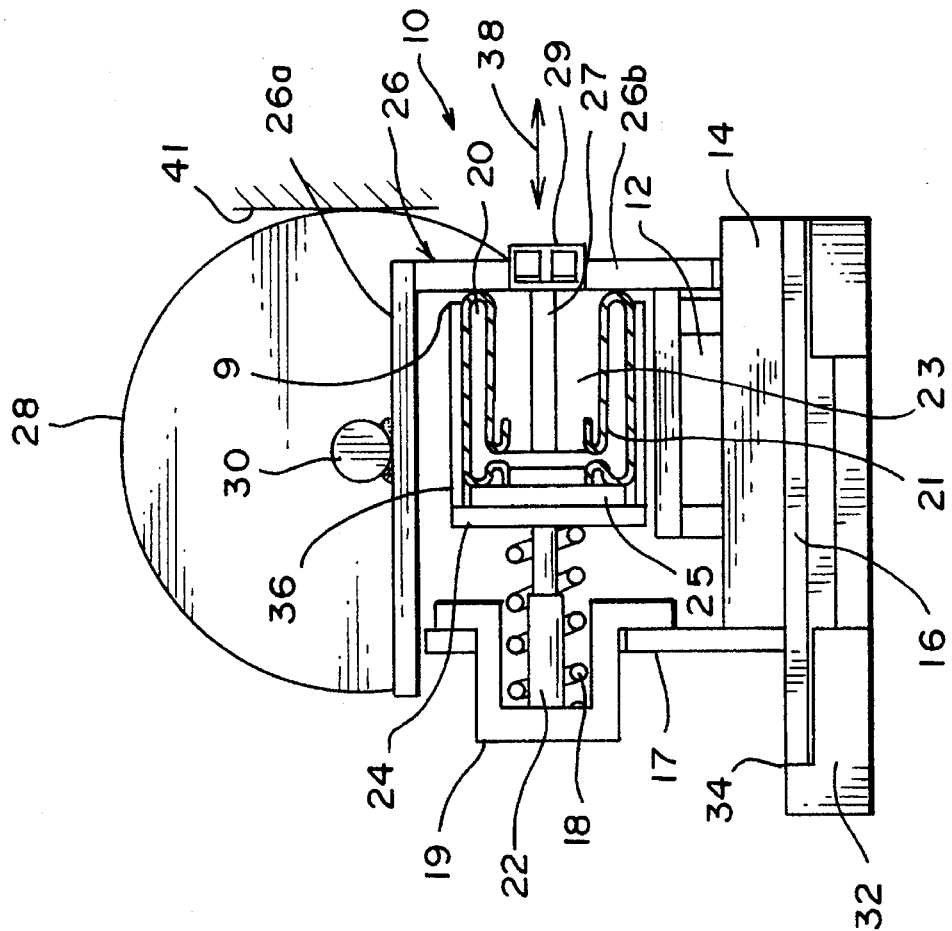
FIG. 2 is a cross-sectional side view along line II—II of FIG. 1.
Figure 1:
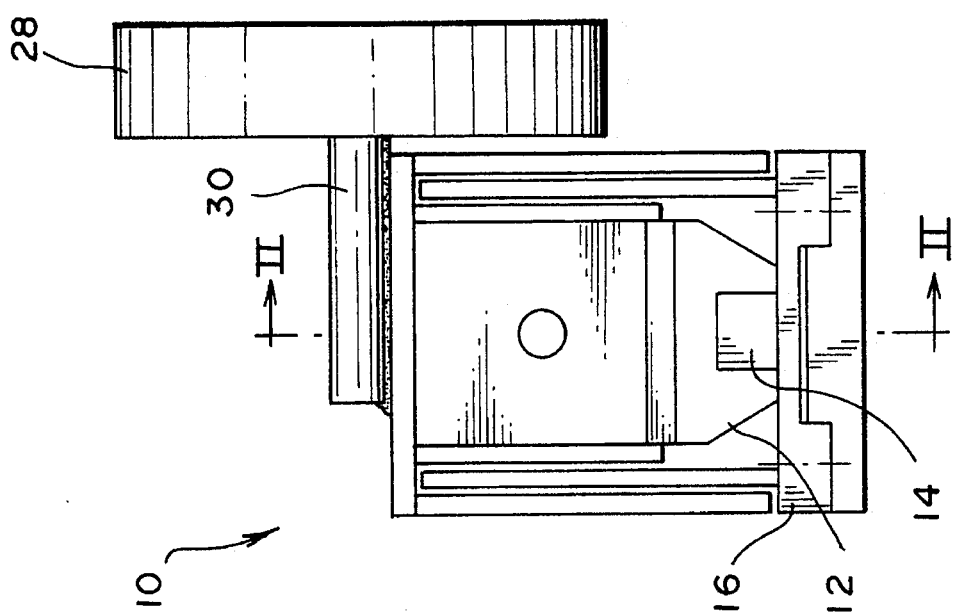
FIG. 1 is an end view of a guide assembly according to one embodiment of the invention with a side roller mounted thereon.

Referring firstly to FIGS. 1 and 2, a guide wheel assembly includes a slider 12 slidably mounted on a slideway 14. The slideway 14 is secured to the foundation or base 16 which, in turn, is fixedly mounted, for example, to a conveyance, for example, a mine cage conveying personnel or a skip for carrying ore along a shaft.

First biasing means in the form of a spring 18 is mounted on the base 16 via mounting plate 17 and spring seat 19. Second biasing means in the form of an air bag unit 20 is connected in series with the spring 18. A damper 22 is provided for damping the spring 18.

Stopper means in the form of a stopper plate 24 is interposed between the spring 18 and the air bag unit 20. Plate 25 is attached to plate 24 and defines a mount for attaching the left-hand end of the air bag 21.

The air bag unit 20 also includes a piston 23 along which the air bag can roll when expanding and compressing. The bore 27 defines an air passage to admit air into the air bag via a valve 29.

Attachment means in the form of a frame 26 is secured to the slider 12. A side roller 28 is rotatably mounted via a shaft 30 welded to portion 26a of the frame 26. The roller 28 is shown in rolling contact with a guide rail 41.

The base 16 is secured to base plate locating plates 32. The base 16 can be adjusted relative to the base plate locating plates 32 by the insertion of shims (not shown) in a gap 34. The base 16 is adjusted to accommodate wear of the roller 28 against a guide rail 41.

The stopper plate 24 together with sleeve 36 limits movement of the air bag unit 20 during its compression stroke when the sleeve 36 strikes end plate 26b of the frame 26. As the air bag unit 20 is compressed the gap shown by reference numeral 9 decreases until it is non-existent. At this point, the air bag 21 cannot be compressed any more. Further compression is then accommodated by the spring 18. Arrow 38 indicates the direction of axial movement of the slider 12 and hence of the frame 26, air bag 21 and the roller 28.

FIGS. 3 and 4 show a guide assembly 10.3 which is similar to that shown in FIGS. 1 and 2 except that a shock-absorbing element in the form of a spring combined with a damper 19 is used to replace the spring 18 and damper 22 shown in FIG. 2. A shock-absorbing element 19 of this kind is available from Continental Aktiengesellschaft of Hannover, Germany, under the tradename "Hydrolager". The center roller 28.3 is rotatably journalled on shaft 35 which, in turn, is mounted on the mounting bracket 37.

Figure 5:
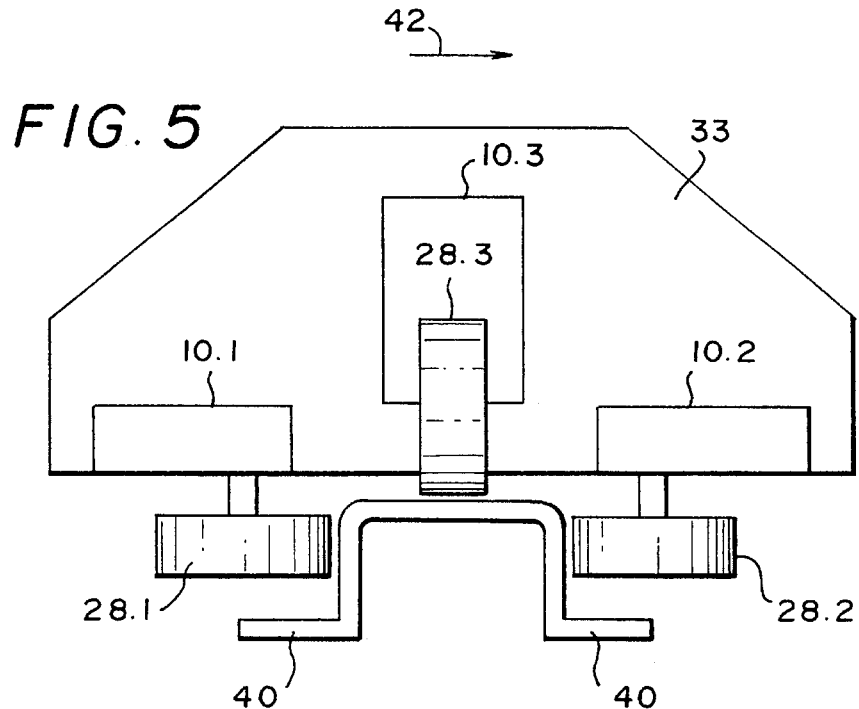
FIG. 5 is a diagrammatic plan view showing three mounting brackets with their rollers abutting a guide rail.

The operation of the guide assemblies will now be described with reference to FIGS. 5 and 7. In FIG. 5, two side guide assemblies 10.1 and 10.2 with rollers 28.1 and 28.2, respectively, are mounted on a base plate 33. A center guide assembly 10.3 with a roller 28.3 is also mounted on the base plate 33. The base plate 33 is secured to a bridle or bridle frame (not shown) of a conveyance such as a cage or skip (also not shown). The three rollers are in contact with a guide rail 40 which is also known as a top hat guide. The guide rail 40 can be mounted, for example, on a wall or vertical structure of a mine shaft.

Figure 7:
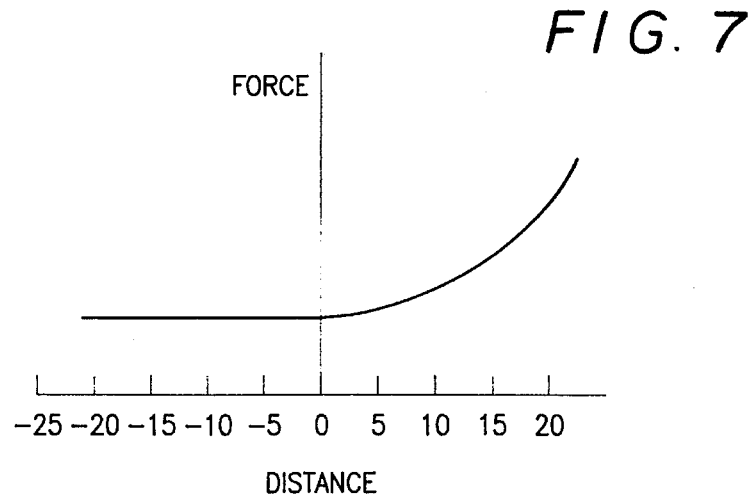
FIG. 7 is a graph of the force exerted by the biasing means on the guide rail via the roller as the roller moves from its median position.

The side rollers 28.1 and 28.2 are in their median positions which is reflected as zero deflection on the graph shown in FIG. 7.

As the cage moves say 20 millimeters to the right in the direction of arrow 42, the force exerted by roller 28.2 on the guide rail 40 remains substantially constant over this distance. This is shown on the left-hand side of the graph. The roller 28.2 remains in contact with the guide rail 40 all the time since the air bag expands and moves the slider 12 and hence the roller 28.2 through 20 millimeters. It is a characteristic of the air bag of the air bag unit 20 that as it expands, the force it exerts remains substantially constant. This air bag could, of course, be replaced with a spring which has substantially the same characteristics.

The movement of 20 millimeters in the direction of arrow 42 results in a rapid increase in the force exerted by the roller 28.1 on the guide rail 40. This is shown in the right-hand side of the graph. The rapid increase in force comes about because the air bag of the air bag unit 20 cannot be compressed because the gap 9 is closed and thus the load is borne by the spring 18 (see FIG. 2) which has a high stiffness.

It will be appreciated that the force exerted by the roller 28.2 on the guide rail 40 adds to the force exerted on roller 28.1. Thus, by ensuring that roller 28.2 only exerts a low force on the guide rail, the force exerted on roller 28.1 is reduced relative to the prior art situation in which both mounting brackets have springs of equal stiffness.

When the cage moves in the opposite direction to arrow 42, roller 28.1 exerts a low constant force against the guide rail and roller 28.2 exerts a high force against the guide rail.

Figure 6:
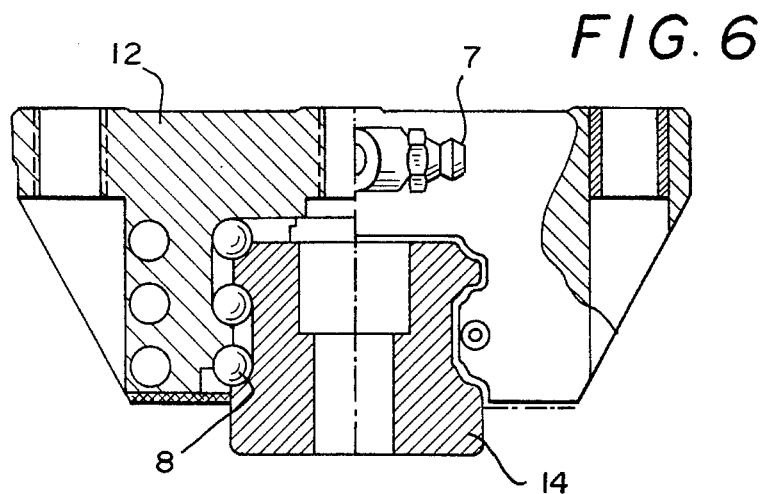
FIG. 6 is a cut-away, cross-sectional end view of a slider and slideway used in the guide assembly.

FIG. 6 is a section view taken through the slider 12 and slideway 14. Ball bearings 8 at the interface of the slider 12 and slideway 14 ensure a smooth gliding movement of the slider on the slideway. A grease fitting 7 is provided to facilitate lubrication of the bearings.

Figure 8:
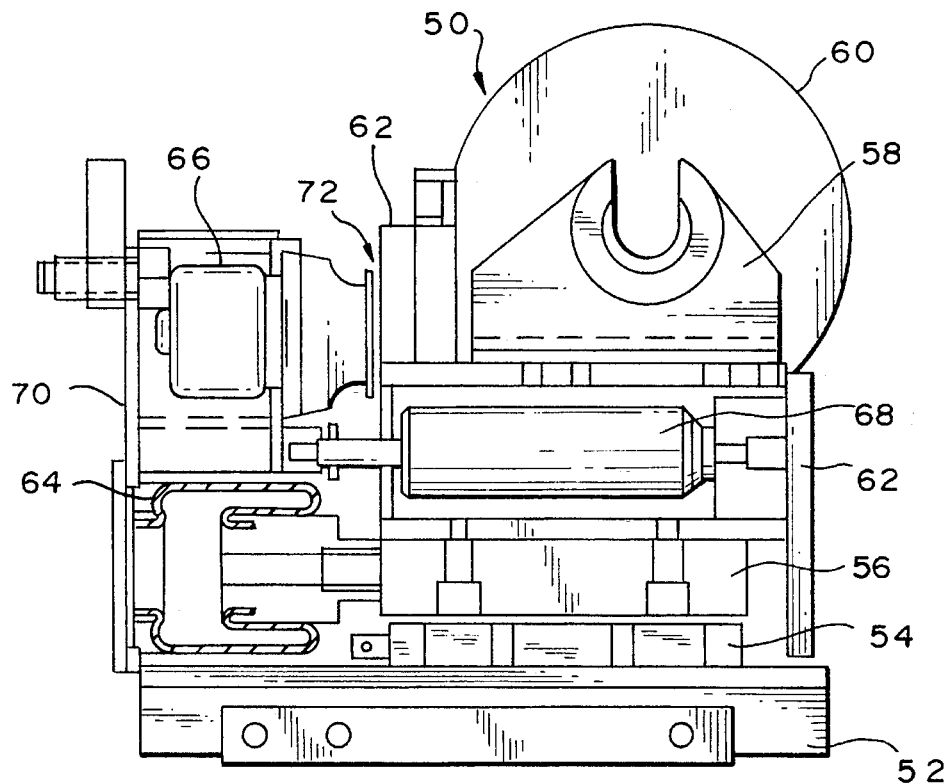
FIG. 8 is a side view of a guide assembly according to still another embodiment of the invention; and, FIG. 9 is a side elevation view of a guide assembly of the invention mounted on a conveyance and equipped with a wheel in rolling contact engagement with a guide rail.

Referring now to FIG. 8, a guide assembly 50 consists of a base 52 to which is secured a slideway 54. A slider 56 is slidably mounted on the slideway 54. A roller bracket 58 for a roller 60 is mounted via a housing 62 to the slider 56. Thus, the roller 60 can slide relative to the base 52. An air bag 64 and a Hydrolager device 66 are mounted in parallel relative to the housing 62. A damper 68 extends between the housing 62 and a back plate 70 to which the air bag 64 and the Hydrolager device 66 are secured.

The roller 60 is shown in its median position in FIG. 8. The roller 60 can move to the right under the influence of the air bag 64. The air bag 64 simply expands and exerts a substantially constant force as the roller 60 moves to the right. When the roller 60 moves to the left from its median position, the air bag 64 is compressed until the gap shown by arrow 72 is closed. Thereafter, the Hydrolager device 66 exerts an exponentially increasing force on the housing 62 and thus on the roller 60, as the roller 60 moves farther to the left.

The damper 68 damps out vibrations and has the ability not to increase the force it exerts when the speed of the slider exceeds about 300 mm/sec.

Figure 9:
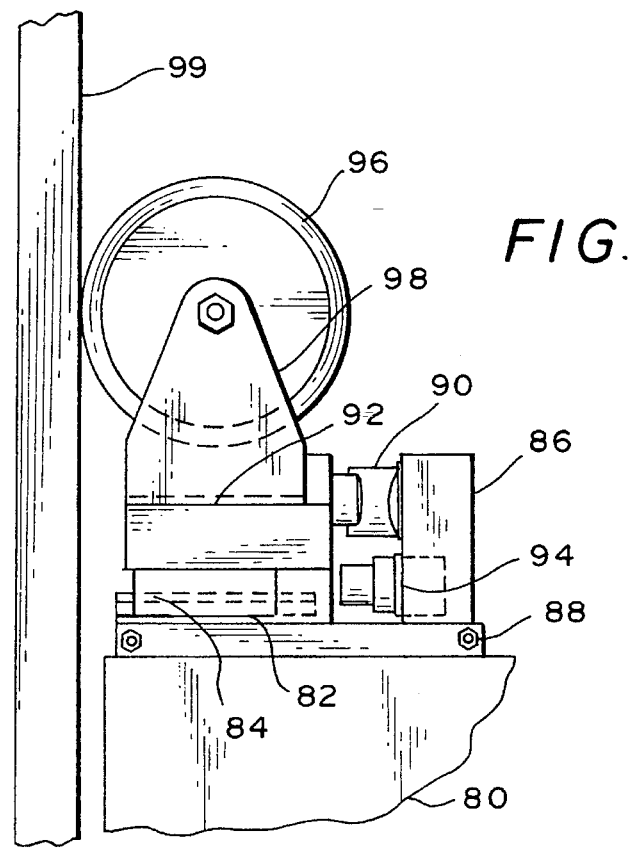

FIG. 9 shows a guide assembly mounted on a conveyance 80. The guide assembly includes a rail or slideway 82 on which a carriage or slider 84 is slidably mounted. A rear mounting wall 86 is fixedly mounted to base 88 and an air spring 90 is interposed between a frame 92 and the mounting wall 86. The frame 92 is, in turn, mounted on the slider 84 so as to be movable therewith. Reference numeral 94 identifies a Hydrolager device fixedly mounted on the mounting wall 86. The wheel 96 is rotatably journalled on mounting bracket 98 and is shown in contact engagement with guide rail 99.

It will be appreciated that many modifications or variations of the invention are possible without departing from the spirit and scope of the invention. For example, although the invention has been described with reference to a slider and slideway, the same result should be achieved with a pivotally mounted arm as opposed to the slider and slideway. The invention accordingly extends to this aspect as well.

What is claimed is:

1. A guide assembly for receiving a lateral load, the guide assembly comprising:

a base having a mounting bracket;

a frame;

coupling means for coupling said frame to said base so as to permit movement by said frame relative to said base;

first and second biasing means;

said first biasing means being mounted between said mounting bracket and said second biasing means;

said second biasing means being mounted between said first biasing means and said frame;

receiving means mounted on said frame to receive said lateral load thereby causing said frame to transmit said load to said biasing means and move relative to said base; and, said coupling means including: a slideway mounted on said base; and, a slider for supporting said frame and slidably engaging said slideway so as to permit linear movement of said frame relative to said base.

2. The guide assembly of claim 1, wherein one of said biasing means has a stiffness greater than the other one of said biasing means.

3. The guide assembly of claim 1, further comprising damping means for damping one of said biasing means.

4. The guide assembly of claim 1, wherein one of said biasing means is configured to exert an increasing force during compression thereof.

5. A guide assembly for receiving a lateral load, the guide assembly comprising:

a base having a mounting bracket;

a frame;

coupling means for coupling said frame to said base so as to permit movement by said frame relative to said base;

first and second biasing means;

said first biasing means being mounted between said mounting bracket and said second biasing means;

said second biasing means being mounted between said first biasing means and said frame;

receiving means mounted on said frame to receive said lateral load thereby causing said frame to transmit said load to said biasing means and move relative to said base;

one of said biasing means being configured to exert an increasing force during compression thereof; and, wherein the other one of said biasing means is configured to exert a substantially constant force during extension thereof.

6. The guide assembly of claim 1, said receiving means being a roller rotatably journalled on said frame.

7. A guide assembly for receiving a lateral load, the guide assembly comprising:

a base having a mounting bracket;

a frame;

coupling means for coupling said frame to said base so as to permit movement by said frame relative to said base;

first and second biasing means;

said first biasing means being mounted between said mounting bracket and said second biasing means;

said second biasing means being mounted between said first biasing means and said frame;

receiving means mounted on said frame to receive said lateral load thereby causing said frame to transmit said load to said biasing means and move relative to said base;

said receiving means and said frame being movable through a predetermined excursion between two limit positions with a mean position between said limit positions; and, said first and second biasing means being adapted to react to said lateral load with a substantially constant force when said receiving means and said frame are moved to one side of said mean position and to react to said lateral load with an increasing force when moved to the other side of said mean position.

8. The guide assembly of claim 7, wherein said increasing force increases from the level of said substantially constant force.

9. The guide assembly of claim 7, wherein said increasing force increases substantially exponentially.

10. A guide assembly for receiving a lateral load, the guide assembly comprising:

a base having a mounting bracket;

a frame;

coupling means for coupling said frame to said base so as to permit movement by said frame relative to said base;

first and second biasing means;

said first biasing means being interposed between said mounting bracket and said frame;

said second biasing means also being interposed between said mounting bracket and said frame so as to be in parallel with said first biasing means; and, receiving means mounted on said frame to receive said lateral load thereby causing said frame to transmit said load to said biasing means and move relative to said base.

11. The guide assembly of claim 10, wherein one of said biasing means has a stiffness greater than the other one of said biasing means.

12. The guide assembly of claim 10, further comprising damping means interposed between said mounting bracket and said frame.

13. The guide assembly of claim 10, said coupling means comprising: a slideway mounted on said base; and, a slider for supporting said frame and slidably engaging said slideway so as to permit linear movement of said frame relative to said base.

14. The guide assembly of claim 10, wherein one of said biasing means is configured to exert an increasing force during compression thereof.

15. The guide assembly of claim 14, wherein the other one of said biasing means is configured to exert a substantially constant force during extension thereof.

16. The guide assembly of claim 10, said receiving means being a roller rotatably journalled on said frame.

17. The guide assembly of claim 10, said receiving means and said frame being movable through a predetermined excursion between two limit positions with a mean position between said limit positions; and, said first and second biasing means being adapted to react to said lateral load with a substantially constant force when said receiving means and said frame are moved to one side of said mean position and to react to said lateral load with an increasing force when moved to the other side of said mean position.

18. The guide assembly of claim 17, wherein said increasing force increases from the level of said substantially constant force.

19. The guide assembly of claim 17, wherein said increasing force increases substantially exponentially.

* * * * *